Nov. 19, 1946.  D. A. WALLACE  2,411,398
PLASTIC MOLDING
Filed Aug. 5, 1942
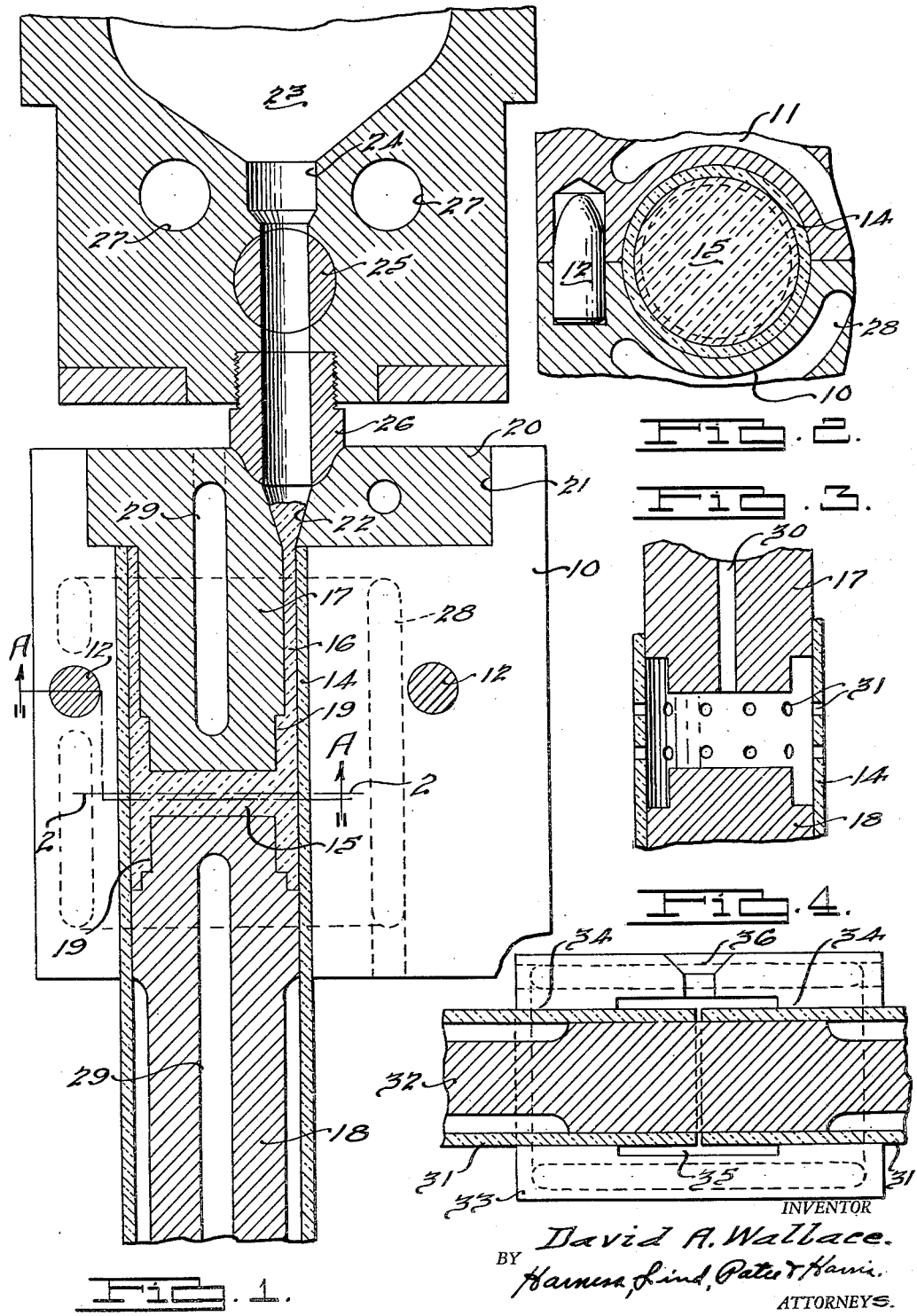
INVENTOR
David A. Wallace.
BY Harness, Lind, Pates & Harris
ATTORNEYS.

Patented Nov. 19, 1946

2,411,398

UNITED STATES PATENT OFFICE 2,411,398

PLASTIC MOLDING

David A. Wallace, Detroit, Mich., assignor to Chrysler Corporation, Highland Park, Mich., a corporation of Delaware Application August 5, 1942, Serial No. 453,619

2 Claims. (Cl. 18—30)

1

This invention relates to an improved plastic molding apparatus and method.

More specifically the invention pertains to an improved apparatus and method of this kind which is particularly adapted to mold and substantially integrally unite either thermosetting or thermoplastic materials to a previously set or cured molded or extruded article comprising either thermosetting or thermoplastic material.

One of the main objects of the invention is the provision of an apparatus and method of this character by which plastic articles can be conveniently produced by a multiplicity of successive molding or extruding operations between which the previously molded plastic is cured or set.

Another object of the invention is the provision of an apparatus and method of this kind by which parts of a plastic structure previously molded or extruded in lengths exceeding that in which they are employed, can be cured or set, cut to size and completed by a subsequent molding or extruding operation.

A further object of the invention is the provision of an apparatus and method of this kind by which internal plastic structure can be molded within and substantially integrally united with a previously molded or extruded completely cured hollow article.

An illustrative embodiment of the invention is shown in the accompanying drawing, in which:

Fig. 1 is a fragmentary vertical sectional view of plastic molding apparatus embodying the invention and illustrating the improved plastic forming method.

Fig. 2 is a transverse section taken on line A—A of Fig. 1.

Fig. 3 is a fragmentary elevational view partly in section of pre-cured or set plastic member prepared for the reception of a subsequent molding operation and illustrating a further development of the invention.

Fig. 4 is a longitudinal sectional view illustrating a molding operation embodying another form of the invention.

The improved plastic molding apparatus shown in the drawing, which also illustrates the improved plastic molding process, comprises a pair of complementary die sections 10 and 11 which may be indexed by pins 12 into proper relationship and clamped together between vice-like jaws (not shown) in accordance with conventional plastic molding practice. The part comprising solidified plastic material of either the thermosetting or thermoplastic type, to which another plastic body is to be substantially integrally bonded is placed

2 between the cavities of the die sections 10 and 11. In the illustration shown, this part comprises a solidified or cured plastic tube 14 in portions of which it is desired to form a partition 15 and a reinforcing lining 16. Mandrels 17 and 18 are inserted into the upper and lower ends respectively of the tube either before or after the latter is disposed in the die. The adjacent extremities of the mandrels 17 and 18 are suitably spaced apart to predetermine the thickness of the partition 15 and portions of the side walls of the mandrels may, if desired, be cut away, as illustrated at 19 in Fig. 1, to provide for thickening of the wall of the tube 14 at a selected location such as adjacent the partition 14.

In the form shown in Fig. 1 the upper mandrel 17 has a head part 20 which is receivable in a recess 21 formed in the die sections. The body part of the mandrel is of smaller cross section than the interior of the tube 14 and is so centrally located therein as to provide an annular space between it and the tube 14 for accommodating the flow of plastic material from an inlet orifice 22 to the space between the adjacent ends of the mandrels as well as into the spaces thereabout.

Molten, flowable plastic composition may be forced through the inlet orifice 22 by any suitable plastic injecting apparatus which, for the purpose of illustration is shown to include a chamber 23 having an outlet passage 24 provided with a valve 25 and a discharge nozzle 26 adapted to deliver molten plastic to the inlet 22. The chamber 23 may be heated in any desired manner, such as by steam or other heating medium circulation through passages 27 formed in its wall structure. The die sections of the mold, as well as the mandrels thereof are preferably provided with passages 28 and 29, respectively, through which may be circulated either cooling or heating medium depending upon the treatment required to solidify the particular type of plastic being molded. When a thermosetting plastic composition is employed, a heating medium is passed through the passages 28 and 29 or electric heating elements (not shown) may be disposed therein. When thermoplastic material is used, a cooling medium is supplied to these passages in order to chill the molten composition after injection thereof into the mold to convert it to a solid state.

Curing or solidification of the plastic is conducted while the injected composition is firmly held under pressure in intimate contact with the pre-solidified or pre-cured plastic part of the composite structure. By following this procedure, the subsequently molded or injected plastic is substantially integrally united with the previously solidified composition to the end that substantially no definite line of demarcation is apparent between the plastic materials solidified at different times. While it is preferable to mold and bond thermosetting plastic compositions and thermoplastic compositions to parts comprising respectively like pre-solidified or cured materials, molten thermosetting compositions may be molded and bonded to pre-solidified thermoplastic material and molten thermoplastic compounds may be molded and bonded to pre-cured thermosetting compounds.

The composite tubular structure formed in accordance with the disclosure in Figs. 1 and 2 may be severed along the line 2—2 of Fig. 1 to provide a pair of containers, each having one closed extremity, such as are useful in many arts including incendiary bombs.

The lining 16 shown at the upper end portion of the structure illustrated in Fig. 1, may be omitted by bringing the body portion of the mandrel 17 to close fitting relationship with respect to the interior of the tube 14 and supplying the molten plastic material to the space between the upper and lower mandrels 17 and 18 through a passage 30 formed in the mandrel 17, as illustrated in Fig. 3. Spaced series of holes 31 may be provided in the portion of the tube surrounding the space between the mandrel to accommodate the flow of the plastic material into direct mechanical interlocked engagement with the tube 14.

The improved plastic molding and bonding apparatus and process may be employed to bond together and substantially integrally unite two or more pre-solidified plastic parts such as sections of tubing, as illustrated in Fig. 4. In this form of the invention, two tube sections 31 are mounted in end to end adjacency on a mandrel 32 having a portion adapted to closely fit the interior of the adjacent end parts of the tube sections. The tube sections thus mounted on the mandrel are then placed in a mold comprising complementary mold parts one of which is shown at 33 and in which is provided a central cavity having end portions 34 adapted to closely fit the exteriors of the tube sections 31 and having an intermediate annular recess 35 extending around and registering with the adjacent end portions of the tube sections. An inlet passage 36 is formed in the mold preferably at the parting line of the parts 33 thereof for admitting molten plastic material to the space between the walls of the recess 35 and the external surfaces of the tube sections registering therewith. When molten plastic material is injected in the manner illustrated in Fig. 1 into the recess 35 and subsequently solidified while under compression by curing or cooling, depending upon the type of plastic material used, the injected plastic substantially integrally unites with the pre-solidified plastic of the portions of both tube sections 31, thereby rigidly joining them in both liquid and gas tight relation.

A large number of plastic compounds may be molded in accordance with the invention, examples of several of the thermosetting and thermoplastic types being respectively phenol formaldehyde, urea formaldehyde, phenol furfural and cellulose acetate, cellulose acetate, butyrale, polystyrene.

Although but several specific embodiments of the invention are herein shown and described, it will be understood that various changes in the sequence of operations, steps and materials employed may be made without departing from the spirit of the invention.

I claim:

1. The method of manufacturing plastic containers having a tubular body and a closed end which comprises forming a cured tubular part from plastic material corresponding in length to the combined lengths of a pair of said containers, embracing said tubular part between die members having complementary cavities for receiving it, inserting a die into each opposite end of said tubular part to define a space therein between adjacent ends of said dies, injecting molten plastic into said space and into firm engagement with the wall portions of said tube surrounding said space, solidifying said plastic material under pressure while in contact with said wall portions, and severing said tube intermediate the thickness of said last injected plastic to produce a pair of containers each having a closed end.

2. Apparatus for forming a plastic structure in the interior of a pre-formed and set plastic tube comprising main die members having complementary cavities for receiving said tube, retractable die members insertable in opposite end portions of said tube and adapted to form a chamber between their adjacent ends and the wall portion of said tube, one of said retractable die members having a molten plastic inlet opening communicating with said chamber, and means for injecting molten plastic material under pressure into said chamber including a discharge nozzle registerable with said inlet.

DAVID A. WALLACE.